(12) United States Patent
Gusciora

(10) Patent No.: US 7,627,611 B2
(45) Date of Patent: Dec. 1, 2009

(54) CONFLICT RESOLUTION IN DATABASE REPLICATION THROUGH AUTONOMOUS NODE QUALIFIED FOLDING

(75) Inventor: Paul H. Gusciora, San Rafeal, CA (US)

(73) Assignee: OSIsoft, Inc., San Leandro, CA (US)

( * ) Notice: Subject to any disclaimer, the term of this patent is extended or adjusted under 35 U.S.C. 154(b) by 308 days.

(21) Appl. No.: 11/893,988

(22) Filed: Aug. 17, 2007

(65) Prior Publication Data
US 2008/0052322 A1    Feb. 28, 2008

Related U.S. Application Data

(60) Provisional application No. 60/838,786, filed on Aug. 17, 2006.

(51) Int. Cl.
*G06F 17/30* (2006.01)
(52) U.S. Cl. .................. 707/200; 707/201; 707/204
(58) Field of Classification Search ................. None
See application file for complete search history.

(56) References Cited

U.S. PATENT DOCUMENTS

| | | |
|---|---|---|
| 5,737,601 A | 4/1998 | Jain et al. |
| 5,924,094 A | 7/1999 | Sutter |
| 5,937,414 A | 8/1999 | Souder et al. |
| 6,820,088 B1 | 11/2004 | Hind et al. |

*Primary Examiner*—Charles Rones
*Assistant Examiner*—Belix M Ortiz
(74) *Attorney, Agent, or Firm*—Lumen Patent Firm

(57) ABSTRACT

In a method for distributed database replication, local change records describing the local changes to the database at a node are transmitted to other nodes. Each node receives from the other nodes other change records describing changes to the database at the other nodes, and a log of change records is accumulated. Each change record describes a change made to a row at a source node, e.g., using data such as an identifier of the source node, a source node abstract clock value, a row identifier, and cell values of the row before and after the change. Autonomously from the other nodes, each node applies the other change records to its local copy of the database, considering the other change records in source node abstract clock order. The other change records are applied by checking for a collision between the other change records and the database and, when a collision is detected, selecting a persistent result by sequentially scanning through the log of change records in order of local abstract clock value to identify the persistent result.

14 Claims, 4 Drawing Sheets

CONFLICT RESOLUTION IN DATABASE REPLICATION THROUGH AUTONOMOUS NODE QUALIFIED FOLDING

CROSS-REFERENCE TO RELATED APPLICATIONS

This application claims priority from U.S. Provisional Patent Application 60/838,786 filed Aug. 17, 2006, which is incorporated herein by reference.

FIELD OF THE INVENTION

The invention relates to distributed databases, and, more particularly, to methods for database replication and resolution of conflicts in distributed databases.

BACKGROUND OF THE INVENTION

A database typically contains one or more tables, each organized in rows (also called records) and columns (also called fields). Each cell of the table contains data values. Cells in the same column typically share a common data type, e.g., integers, floating point numbers, alphanumeric strings, and bit patterns representing images or other data types. Data in columns can be compared for equality, but do not necessarily have to be compared for sort order.

In contrast to a centralized database where database information is stored and modified at a single server, the data in a distributed database is stored and modified at multiple sites (or nodes). For example, FIG. 1 illustrates a database distributed among nodes 100, 102, 104, each containing a local copy of Table 1 of a database and each receiving local commands 106, 108, 110, respectively, to change the data in the local copies of the database. The local changes may be, for example, commands to insert (add), update (change), or delete one or more rows (or records).

Each row of a database table typically has column containing a primary key which contains a value that uniquely identifies each row. In a distributed database, this key is the same for corresponding copies of the same row stored on other nodes. For example, this key might contain a row identifier value assigned sequentially by the local node within a unique range that is assigned to each node, or might be the composite of a row identifier value assigned sequentially by the local node together with a unique node identifier value.

Replication typically involves periodically (e.g., at scheduled replication intervals) collecting the changes made at each node, transporting descriptions of the changes to other nodes (e.g., via network communication links 112 and 114), and applying the changes at each of nodes 100, 102, 104, resulting in changed records 116, 118, 120, respectively. If all changes have been propagated to all nodes and resolved consistently and uniformly, then the replication has resulted in synchronization of the database copies at all the nodes.

Collisions occur in replication when multiple changes are made between replication intervals on different nodes to data in the same cells. Depending on the details of how the replication is performed, collisions may result in one of the changes persisting, the replication stopping for manual intervention, or may result in an undesirable result that the nodes never converge to the same copy.

Existing replication techniques provide several alternatives for resolving collisions. One collision resolution process prescribes the behavior of pairs of nodes. Each node participating in the replication collapses all changes made to a column to one overall change during the replication interval. During the replication process, both nodes compare changes. If a collision is detected, it is resolved by selecting a winning value for a column, and an additional record documenting the collision resolution is generated for transmission to other nodes.

Although this method is popular and used commercially, it does not handle closed replication topologies such as rings of nodes or topologies where nodes might replicate with multiple partners in a mesh or grid arrangement, or might replicate opportunistically to different partners available at different times. Also, conflict resolution involves generating additional change records which must be propagated to all nodes. In some topologies, each collision can generate large bursts of collision resolution records. Some commercial replication implementations try to avoid this problem by having special collision damping code which tries to suppress the excess records.

Additional problems in replication arise from constraints placed on multiple rows. For example, a uniqueness constraint may require that each cell in a particular column contains a unique value. Another example is when an operation on a set of values in a column is constrained by value; for example, the constraint that the sum of the values contained in a column must be greater than zero. While it is easy to enforce constraints when all changes are made on one node, it becomes possible to violate a constraint when changes are made at different nodes and a violation is detected only when the changes propagate by replication to a common node.

U.S. Pat. No. 5,924,094 discloses a distributed database system in which each site (server) transmits its changes to all other servers using local time-stamps to order changes. Local time stamps suffer from the problem that different servers have different times and the time can be changed such that a later modification might receive an earlier time stamp than the previous modification. When a server has a time far in the future, the record becomes poisoned and can never be changed. This time-synchronization algorithm can not be guaranteed to work. It does not provide any way of resolving collisions that occur because changes to same record are presented to different servers between replication times. There is a fixed replication arrangement pre-determined by central intelligence, does not allow communication among servers connected in rings or loops, requires bi-directional communication between replicating pairs, and needs a root for each activity.

U.S. Pat. Nos. 5,937,414 and 5,737,601 disclose procedural replication techniques in which all nodes are known in advance. Procedural replication involves migrating the commands that perform an insert, edit, or delete to all known nodes. Procedural replication does not record the state of the columns before the change.

SUMMARY OF THE INVENTION

The present invention provides a method for distributed database replication. When changes are allowed at all nodes and records are not partitioned for access, conflicts occur when a change is made to a row that has already been changed on a different node. The process for replication allows each node to act autonomously to detect and resolve conflicts by qualifying each change against previous changes made to the same row. Each change to a row is folded into the current local copy resulting in rejection or retention of a change to each column or group of columns. The process allows for networks of nodes communicating changes continuously or intermittently in rings, meshes, or grids.

In one embodiment, a method is implemented in each node of a distributed database system composed of multiple nodes. Each node stores a database a local copy of a distributed database and accepts local changes to the database. Each node also maintains a local abstract clock value which is incremented each time a local change is accepted.

Local change records describing the local changes to the database are transmitted to other nodes, typically over a computer network connecting the nodes. Each node receives from the other nodes other change records describing changes to the database at the other nodes, and a log of change records is accumulated. The change records in the log include both the local change records and the other change records. Each change record describes a change made to a row at a source node, e.g., using data such as an identifier of the source node, a source node abstract clock value, a row identifier, and cell values of the row before and after the change. Each node also maintains, for each of the other nodes, a highest value of the source abstract clock value of other change records received from the other nodes. Autonomously from the other nodes, each node applies the other change records to its local copy of the database, considering the other change records in source node abstract clock order. The other change records are applied by checking for a collision between the other change records and the database and, when a collision is detected, selecting a persistent result by sequentially scanning through the log of change records in order of local abstract clock value to identify the persistent result.

DETAILED DESCRIPTION

Figures 1, 2:
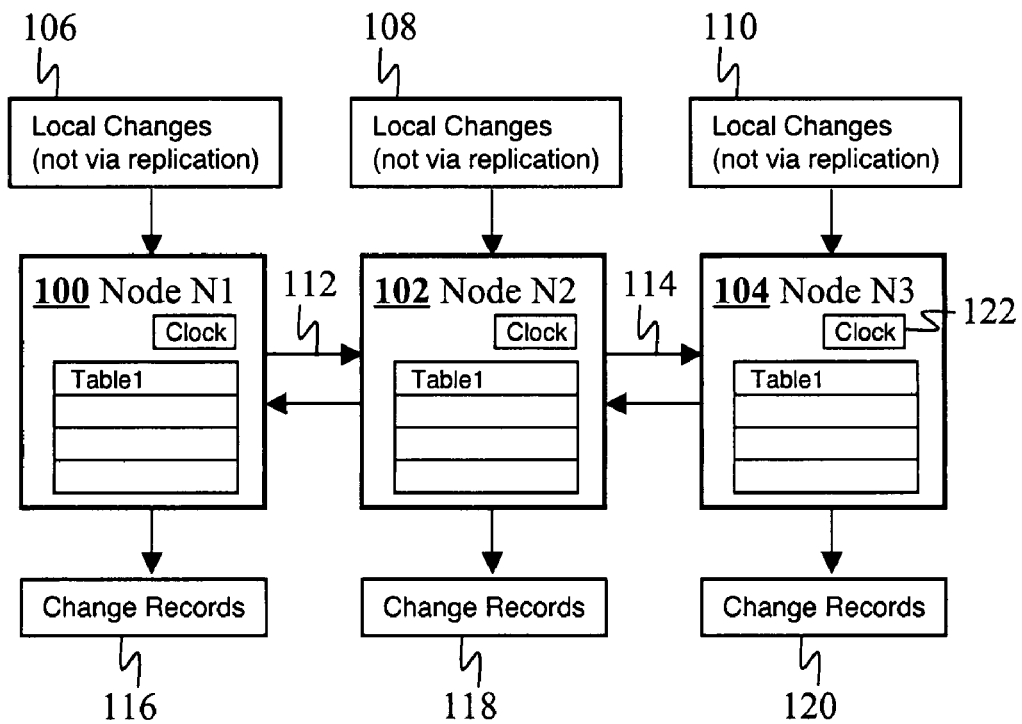
FIG. 1 is a block diagram of a distributed database system which may be used to implement embodiments of the present invention.
FIG. 2 is a schematic diagram illustrating a table of change records, according to an embodiment of the invention.

Embodiments of the present invention may be implemented in a distributed database system such as that shown in FIG. 1. The nodes are connected to each other, e.g., using standard digital networking devices and protocols, to form a digital network. Although the three nodes in FIG. 1 are organized in a simple linear network topology, the replication methods of the present invention may be used in systems with any plurality of nodes organized in various topologies including rings, meshes, and grids. Each of the nodes 100, 102, 104 may be implemented using various types of computing hardware and software suitable for database storage and processing, for example, as computer system composed of one or more computers, digital processors, digital storage media/devices and networking equipment.

Each node stores a local copy of a distributed database that may include one or more tables, each containing rows and columns. Each node also accepts local changes to the database. A local change at a given node refers to a change request handled by the node, whether the request originated at the node or at another location. For example, if a remote client accessing the database via a given node makes a request to change data in the database, such a request is a local change request at that node. Each time a local change is accepted at a node, a local abstract clock value at the node is incremented. In one embodiment, the clock is incremented for locally generated changes only. Alternatively, the clock may be incremented for all changes, both locally generated and generated at other nodes. In addition, a row version number for the changed row is incremented, and a local change record describing the local change to the database is generated and stored. The change record includes information such as a local node identifier, the local abstract clock value at the time of the change, the time stamp of the local node clock, the row version, row number, and details of the values changed in the row. Preferably, the change record includes row values before the change as well as row values after the change so that the change record completely specifies exactly what row values were changed, what their values were prior to the change, and what their values were changed to.

Periodically, a set of recent local change records at a node are transmitted over the network to one or more other nodes. Each node receives from one or more other nodes change records describing the changes to the database made at the other nodes. These transmissions may take place upon request and/or on a schedule, and may traverse a network involving other intermediate nodes, servers, devices, etc. The transmitted list of change records may be selected to contain those local changes whose abstract clock values are greater than a certain value (such as a value when changes were last sent). A refinement can supply the changes in blocks, or limited to certain change-source nodes.

Following are examples of two different methods of generating and communicating change records. According to the first (preferred) method, each node maintains, receives, and forwards change records representing all changes applied at every node. This first method is easy to understand, works with any topology, and results in every node eventually having a record of all changes that were applied to every row, even though each node has the changes in a different order. This is a desired behavior for many regulated industries, but requires more data to be transmitted than if only successful changes were recorded. (A change is called successful if it is not rejected by a constraint and not rolled back or abandoned.) A disadvantage in some implementations is that the nodes must keep track of the changes as originally applied at the change-source node in addition to the local transaction log that they might normally maintain. (A transaction log is, for example, a record of all changes attempted or a record of all changes made. Together with an initial copy of the database, it is typically used to restore the database in the event of a crash.)

According to an alternate method, each node receives change records from other nodes, but maintains and forwards change records representing any resulting successful change, i.e., any resulting change that is applied. The advantage of this method is that there is less for each node to track, as it can reuse the transaction log that might normally be maintained. Another advantage is that some nodes can transfer and track fewer change records, because the change records that were eliminated by collision do not need to be transported. A disadvantage in some implementations is that the behavior may be harder to understand, and the method might not perform as desired in all cases, e.g., for all topologies or opportunistic replication strategies.

Each node accumulates a log of change records, as illustrated schematically in FIG. 2. The log includes both the local change records describing local changes to the database as well as the change records received from other nodes describing their changes to their local copies of the database. Each change record, shown in FIG. 2 as a row of the table, describes a change made at a particular source node to a row of the database stored at that node. The change records may be represented in various forms. For example, the log of change records shown in FIG. 2 includes data for each record that are labeled by columns such as an identifier NodeID of the source node 200 where the change was made, a source node abstract clock value 202 indicating the abstract time the change was made at the source node, a global row identifier RowID 204 indicating the row of the database where the change was made, a row version number 206 (also called row edition or row change count), a column identifier ColumnID 208 indicating the column of the database where the change was made, the value of the indicated row-column cell before the change 210, and the value of the indicated row-column cell after the change 212. The NodeID 200, ClockValue 202, and RowVersion 206 are referred to as replication control columns. The combination of NodeID and RowID may be regarded as the primary key for the row. Each change record preferably includes the above information for the row values both before and after the change (i.e., original and final values). The change records may also include other information as well, such as a time stamp indicating the time of the change at the source node according to the source node clock. It is preferred that the change record be in the form of a change digest where only the changed column values are recorded together with the primary key and replication columns. However, various other change record formats may be used, such as the entire set of original values together with only the changed final values, the entire set of final values with only the changed original values, or the entire set of original and the entire set of final values.

Each node maintains a local abstract clock (e.g., clock 122 in FIG. 1). The abstract clock values are preferably sequential integers providing a temporal sequence, and do not correspond with real times. The abstract clock value may have gaps corresponding to abandoned transactions, but it is preferred that there be no gaps in the values, perhaps by creating null change records corresponding to abandoned transactions, or by assigning a clock value only to completed transactions. (A completed transaction is a transaction that is not rejected by a constraint and is not abandoned. An abandoned transaction is a transaction that is not completed, e.g., due to timeout or rollback.)

Figure 3:
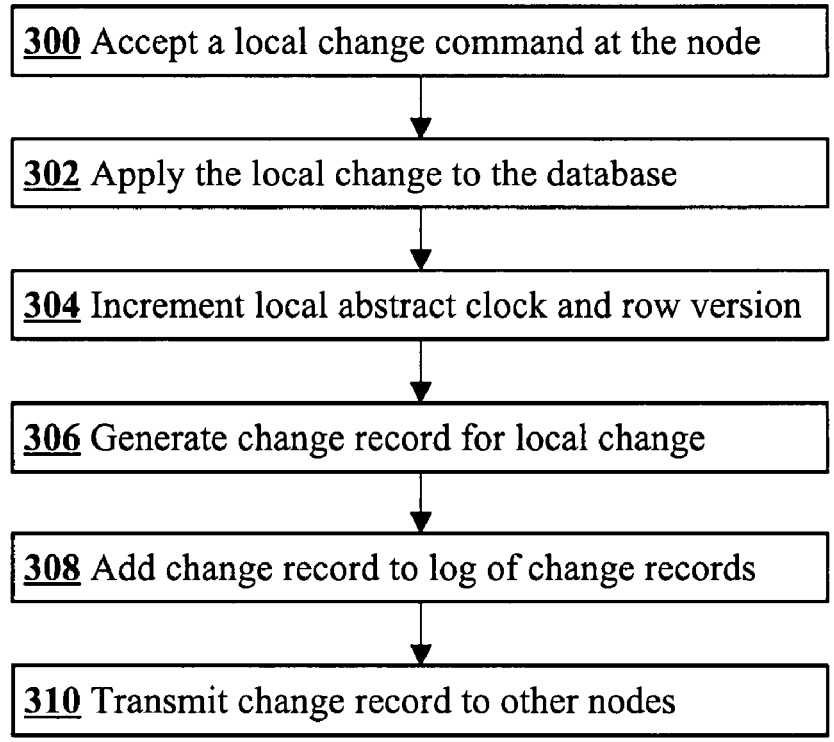
FIG. 3 is a flowchart illustrating steps related to applying local changes to a node and transmitting corresponding change records to other nodes, according to an embodiment of the invention.

FIG. 3 is a flowchart summarizing the steps used for applying local changes at a node, generating and adding local change records to the log, and transmitting local change records to other nodes. A local change command is accepted by the node in step 300 and applied to the local copy of the database in step 302. In step 304 the local abstract clock is incremented as well as the row version number of the row that was changed. A change record describing the local change is generated in step 306 and added to the log of change records in step 308. In step 310 change records from the log are transmitted to one or more other nodes. In some embodiments, step 310 is not necessarily performed after every local change. Instead, change records are sent to other nodes upon request from other nodes or periodically according to a schedule.

Figure 4:
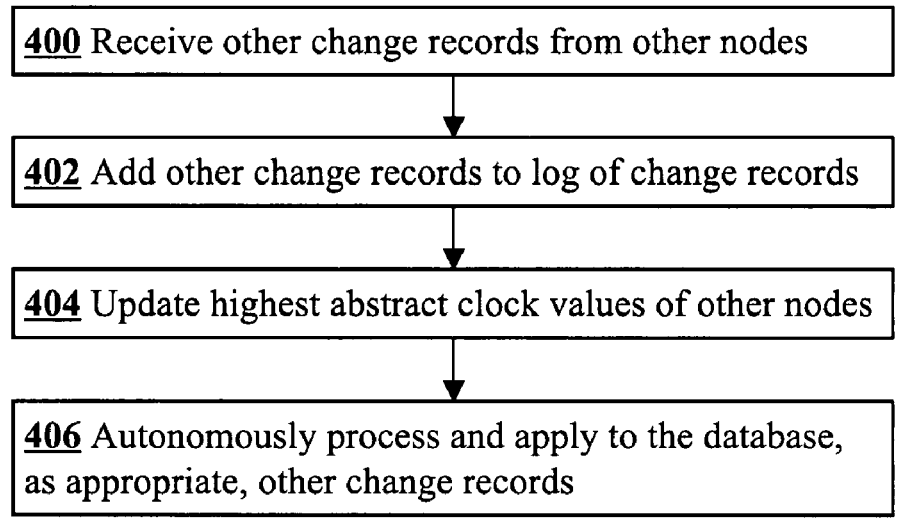
FIG. 4 is a flowchart illustrating steps related to receiving change records from other nodes and applying them, according to an embodiment of the invention.

FIG. 4 is a flowchart summarizing the steps used for receiving change records from other nodes, adding them to the log of change records, and applying them to the local copy of the database. In step 400 a set of change records is received from another node. These change records are added to the log of change records in step 402. In step 404 the highest abstract clock value of the other node is updated based on the abstract clock values present in the received change records from the node. The change records received from the other node are then processed and applied, as appropriate, to the local copy of the database in step 406, which will be described in more detail in relation to FIG. 5. These steps are repeated for each set of change records received.

Preferably, each node also maintains a list of all source nodes together with, for each of the source nodes, a largest value of that node's abstract clock values as indicated in all change records received from that node. Similarly, the largest value of the time from each node can also be maintained. For diagnostic purposes, this information can be inspected to determine that convergence of the distributed database has occurred, i.e., by checking to see whether the largest clock values in the lists on all nodes are the same.

Although the nodes communicate their database changes with each other, each node makes autonomous decisions on how to modify its local copy of the database. In other words, although changes to the database at any node take into account changes made at other nodes, they do not require negotiation with the other nodes. Thus, autonomous in this context means that each node independently decides how to apply changes to its local copy of the database using information about how other nodes have applied changes to their local copies of the database, but without requiring inter-node negotiations or mutual agreements between nodes regarding how specific conflicts between local changes and changes at other nodes should be resolved. (Of course, nodes do share a set of predetermined rules that govern how conflicts in general should be resolved. These rules are predetermined in advance of database changes and normally remain fixed.)

Figure 5:
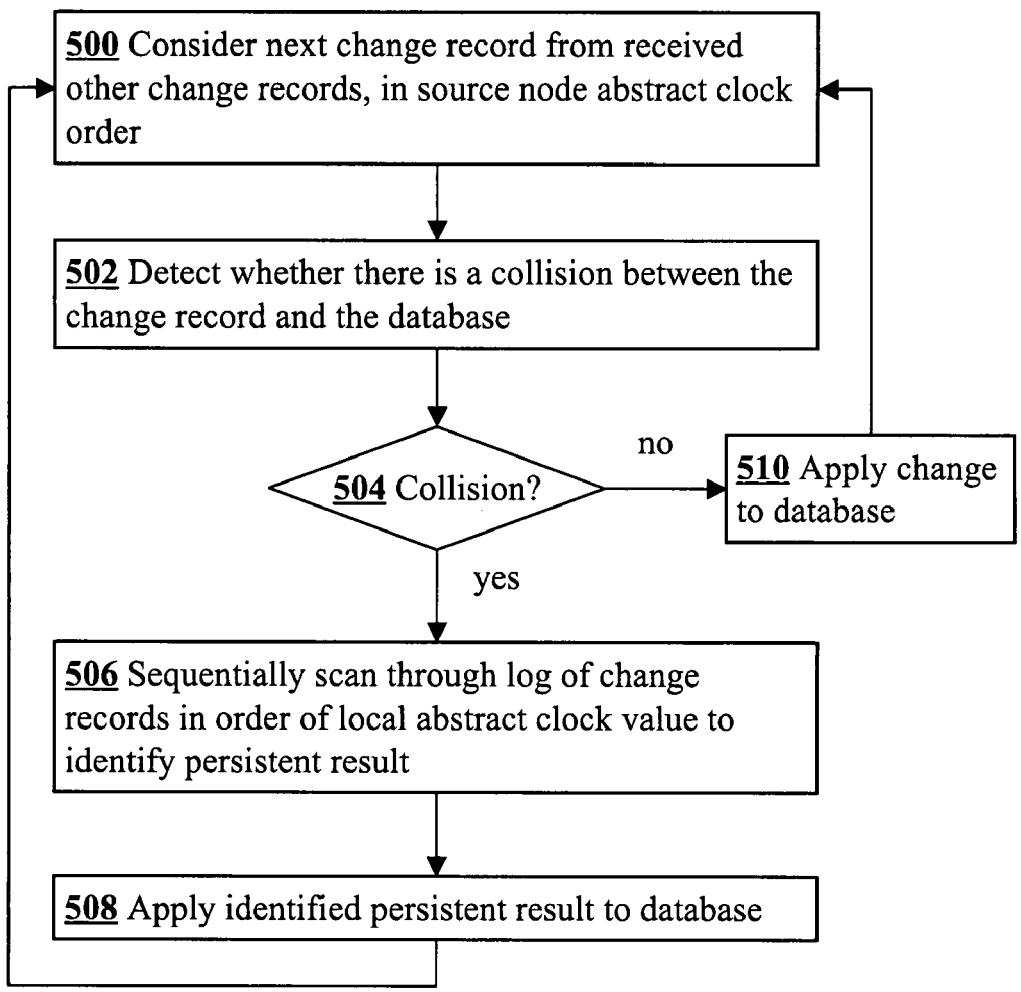
FIG. 5 is a flowchart illustrating details related to processing change records received from other nodes, according to an embodiment of the invention.

FIG. 5 is a flowchart summarizing the details of step 406 of FIG. 4, i.e., the replication steps used to process and apply, as appropriate, a set of change records received from another node. Each node considers the change records received from the other nodes, and replicates these changes in its local copy of the database, as appropriate. The change records are considered one by one in order of their source node abstract clock value, as indicated in step 500. For a given change record being considered, the change record is compared to the local copy of the database to check for a collision, as shown in step 502. If there is no collision, decision block 504 transfers control to step 510 which applies the change to the database. If there is a collision, control goes to step 506 which sequentially scans through the log of change records to identify a persistent result, as will be described in more detail in relation to FIG. 6. The identified persistent result is then applied to the database in step 508. Control then returns to step 500 to process the next change record until all change records have been considered. Various aspects of the steps in FIG. 5 will now be described in more detail.

According to this replication technique, for each source node, all new change records received from that source node are considered sequentially in order of their source node abstract clock values. Each change record is considered by a technique called qualified folding. According to this technique, it is determined whether there is a collision (i.e., conflict) between the change described by the change record and the local copy of the database. If no collision is detected, then the change may be directly applied to the local copy of the database. If a collision is detected, a persistent result is selected by sequentially scanning through the log of change records to identify a winning value, which is then applied to the local copy of the database. For efficiency, in some embodiments the system could scan in reverse from a current point to find a match of primary key, changed column original value, original version number, change source node, change source abstract clock, and change source timestamp. This would eliminate a lot of rows that need to be processed.

A collision may be detected as follows. If the change record represents a change to the current edition of the corresponding row in the local copy of the database, then there is no collision and the change can be applied directly. More specifically, the value of the RowID contained in the change record is matched with a RowID in the current local copy of the database. There is no collision if the current values of the matching row in the database and the original row values indicated in the change record have the same values for row version number, column value(s), change-source node, change-source abstract clock, and change-source time. If the row indicated in the change record does not exist in the database, and the change corresponds to a row insertion, and there is no change record in the change log corresponding to a deletion of that row, the row can be inserted in the database. (Note: checking the change log protects against a perverse case where a delete shows up before an insert, e.g., with defective primary keys, the alternate transmission and/or switching rapidly between replicating nodes.) If the row exists, and the change corresponds to a row deletion, the row can be deleted. In other cases, a collision has occurred, and steps are taken to select a persistent result.

Collisions are typically resolved on a column-by-column basis. In some cases, however, multiple columns may need to be handled together as a unit. For example, some relational database management systems provide for row collision detection or column collision detection at the price of lower performance. The present method provides column collision detection. If row or groups of columns are grouped for conflict resolution, then those columns can be encapsulated into one object, container, or column for replication, or a change record can be generated and transported for the columns as if they are one object. The system compares the resulting object or container for equality to the change record being applied, but need not compare it for sort order The persistent result is selected via a process that is independent of the order that the change records are received from the various change-source nodes. The rules for selecting the persistent result are established and parameterized before replication begins, and the parameterization is not changed to ensure consistency among nodes. Examples of parameters which may be used for selecting a persistent result are weights on node number, node priority, time difference, and maximum time difference to use when breaking a tie.

Figure 6:
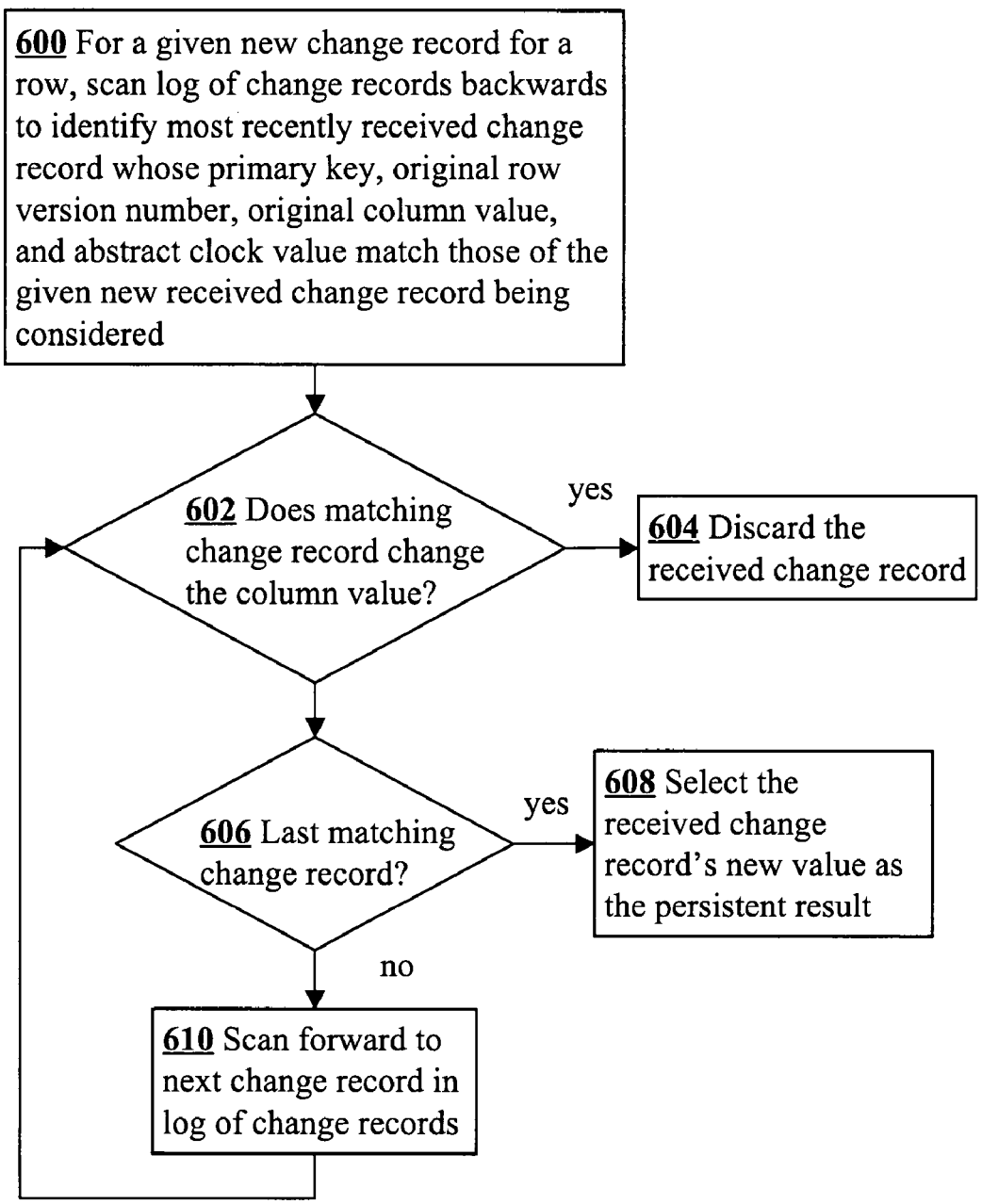
FIG. 6 is a flowchart illustrating details related to selecting a persistent value in the case of a collision, according to an embodiment of the invention.

Details of selecting the persistent result (step 506 of FIG. 5) in the event of a collision will now be described in relation to FIG. 6 which summarizes the steps for sequentially scanning the change records log to determine a persistent result to apply. The change record in question may, in general, describe changes to multiple columns of a row. In this case, each column is treated independently to determine a persistent value for that column. Thus, without loss of generality, we will now describe the process for a change record which describes a change to the value in one column of a row.

In step 600, the local log of change records is searched backwards by abstract clock value to identify the most recent change record whose primary key, original column value, original row version number, change-source abstract clock value, and change-source time match those of the new received change record currently being considered. If the matching change record changed the original column value (step 602), the new received change record being considered is discarded (step 604) because a subsequent change record must have been applied and resulted in a different value in the current local copy of the database. Otherwise, the received change record is not discarded and the process checks (step 606) whether all the matching change records have been scanned. If so, the received change record has not been discarded, and its change to the column persists (step 608). If not, the change records log is scanned forward to identify the next change record in the log with matching primary key and matching changed column value (step 610). Control is then given to step 602, which checks if the matching change record changed the column value. The process thus either selects the received change record's new value for the column as the persistent result or selects the currently existing value in the local copy of the database as the persistent result.

With this process, it is possible to use various metrics to break a tie, including choosing the change with the latest clock value, and if the clock values are identical (or no clock values are available), selecting the change from the node with the highest priority. A tie can occur, for example, if two nodes make changes to the same row with the same starting value, the same row version, and same time (i.e., the times are within a predetermined threshold). A small weight on clock time, limited by the predetermined threshold can be used. Breaking a tie may involve selecting which node's change will persist, and/or to which node a change is attributed. A metric for breaking a tie may be computed, for example, by calculating a value of a parameterized function, e.g., a weighted sum of node number, node priority, and the minimum of a predetermined threshold time and a time offset from a mean time of the tied changes. The change with the largest value for this weighted sum wins.

It is also possible with this process to have a metric which allows a node to override a change to a row made at a node that had its clock (incorrectly) far in the future. For example, suppose node N3 has its clock incorrectly set one year into the future and makes a change to a row, incrementing its row version number. Node N3 then generates a corresponding change record which is sent to node N1 whose clock is correctly set to the present time. When node N1 applies this change from node N3, the change would incorrectly persist if the method were based upon time. In the present method, however, row version rather than time is used to coordinate changes. Consequently, an appropriate set of rules in the change record scanning step can naturally allow any other node to initiate a change that can override the change made on node N3.

An advantage of the present technique for replication is that each node arrives at same result as the other nodes in parallel and independently, without negotiating with other nodes. In practice, this technique results in very few collisions, and the changes flow from each change-source node to all other nodes and can be applied efficiently. When collisions occur, the nodes apply deterministic logic to select which change persists. Although nodes might receive the changes from different nodes in different orders, the nodes converge to the same end result and there are no secondary messages or change digests that need to be propagated to the other nodes.

Another advantage of this process is that it naturally handles ring, mesh, or grid connection topology between nodes, and can handle cases where nodes do not have continuous connections to other nodes.

This process can handle constraints on columns to the extent that the constraints can be resolved in parallel on the nodes. Uniqueness constraints can be satisfied by appending a value to the column to maintain uniqueness. Since each node might see the change records from the change-source nodes in any order, each node can append a value in a way that the result is independent of order of receipt. One example would be to append the node identifier and abstract clock of the change to the value. Another possibility is to reject one change as a collision when finally received on an intermediate node. This would result in some nodes seeing the change applied and then removed when the change which ultimately persists arrives.

The invention claimed is:

1. A computer-implemented method implemented in each node of a distributed database system comprising multiple nodes, the method comprising:

storing a database, wherein the database is a local copy of a distributed database;

maintaining a local abstract clock value;

accepting local changes to the database;

incrementing the local abstract clock value each time a local change is accepted;

transmitting to other nodes local change records describing the local changes to the database;

receiving from the other nodes other change records describing changes to the database at the other nodes;

accumulating a log of change records, wherein the change records comprise the local change records and the other change records, wherein each change record describes a change made to a row at a source node, wherein each change record comprises an identifier of the source node, a source node abstract clock value, a row identifier, a row version number, and cell values of the row before and after the change;

autonomously applying the other change records to the database, wherein the other change records are considered in source node abstract clock order, wherein autonomously applying the other change records comprises detecting a collision between the other change records and the database and, when a collision is detected, selecting a persistent result, wherein selecting a persistent result comprises, for each change record, sequentially scanning through the log of change records in order of local abstract clock value to identify the persistent result.

2. The method of claim 1 wherein detecting a collision comprises checking if a record in the database has values that match original values for the identifier of a source node, a source node abstract clock value, a row identifier, a row version number, and changed cell values of a change record under consideration.

3. The method of claim 1 wherein scanning through the log of change records comprises identifying a changed record matching values of a change record being considered.

4. The method of claim 3 wherein scanning through the log of change records further comprises discarding the change record being considered if the identified change record changed a column value changed by the change record being considered.

5. The method of claim 1 wherein selecting a persistent result comprises, for a change record being considered, selecting a currently existing value in the database if the change record being considered is discarded by the scanning through the log of change records.

6. The method of claim 1 wherein selecting a persistent result comprises, for a change record being considered, selecting a new value from the change record being considered if the change record being considered is not discarded by the scanning through the log of change records.

7. The method of claim 1 wherein selecting the persistent result comprises, if there is a tie between multiple other change records, breaking the tie by calculating a weighted parameterized function to select a winning change record, wherein the weighted parameterized function includes a predetermined time threshold.

8. The method of claim 1 further comprising maintaining, for each of the other nodes, a highest value of a source abstract clock value of other change records received from the other nodes.

9. The method of claim 1 further comprising receiving a request for a list containing a highest value of a source abstract clock value for each of the other nodes, and transmitting the list in response to the request.

10. The method of claim 1 further comprising transmitting to another node a request for change records whose abstract clock values are greater than a specified value.

11. The method of claim 1 further comprising forwarding the received other change records to one or more nodes.

12. The method of claim 1 further comprising transmitting to the other nodes change records describing changes to the database resulting from the applying of the other change records to the database.

13. The method of claim 1 further comprising receiving from another node a request for change records whose abstract clock values are greater than a specified value and transmitting to the another node local change records satisfying the request.

14. The method of claim 1 wherein each change record further comprises a time stamp indicating a time of the change made to the row at the source node.

* * * * *